July 12, 1938.  S. THOMPSON  2,123,319
MIRROR AND VISOR ATTACHMENT FOR MOTOR VEHICLES
Filed July 14, 1937
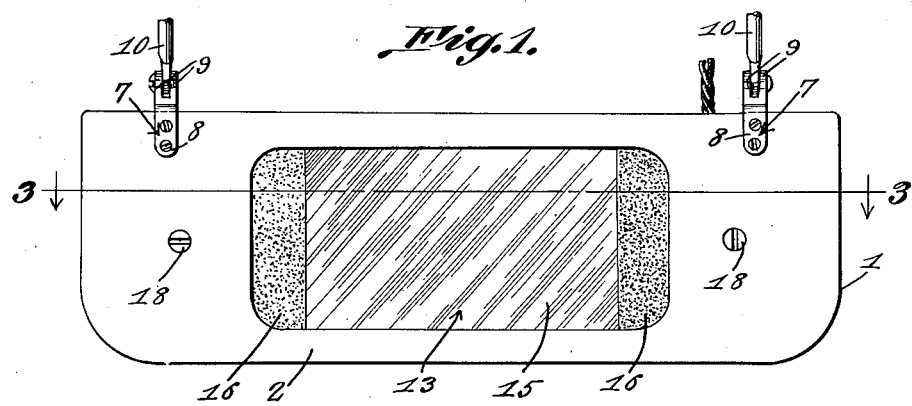
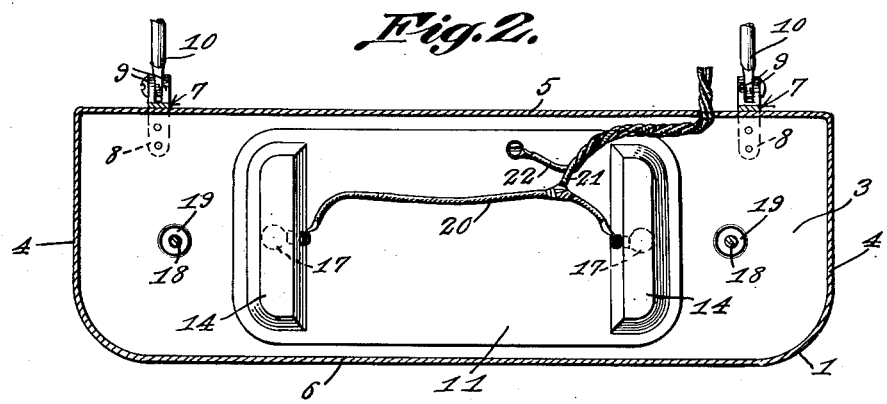
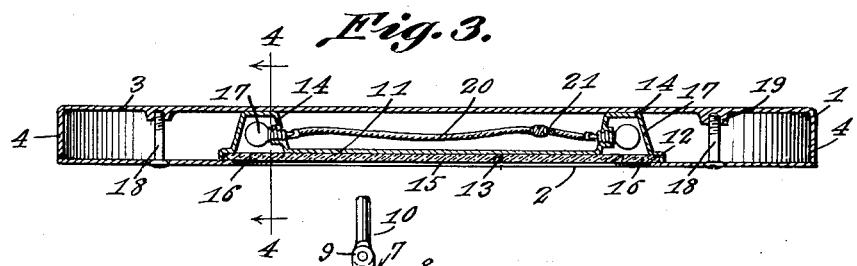
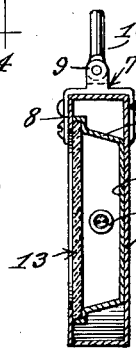
Sigurd Thompson, INVENTOR
BY Victor J. Evans & Co.
ATTORNEYS Patented July 12, 1938

2,123,319

UNITED STATES PATENT OFFICE 2,123,319

MIRROR AND VISOR ATTACHMENT FOR MOTOR VEHICLES

Sigurd Thompson, Poplar, Mont., assignor of one-half to Peder Moe, Poplar, Mont.

Application July 14, 1937, Serial No. 153,630

1 Claim. (Cl. 240—4.2)

This invention relates to vanity mirrors, for motor vehicles, and its general object is to provide a combined mirror and sun visor attachment for a motor vehicle to be adjustably secured in the body thereof for use above the windshield, that is capable of performing all of the functions of both, and the body of the attachment not only acts as a visor to shield the eyes of the occupants of the vehicle, but is constructed to provide a frame for the mirror to carry the latter, as well as a housing for illuminating means for the mirror so that the latter can be used after dark.

A further object is to provide a mirror and sun visor attachment for a motor vehicle, that is simple in constuction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a front elevation of the attachment which forms the subject matter of the present invention.

Figure 2 is a longitudinal vertical sectional view taken therethrough.

Figure 3 is a sectional view taken approximately on line 3—3 of Figure 1, looking in the direction of the arrows, and Figure 4 is a sectional view taken approximately on line 4—4 of Figure 3, looking in the direction of the arrows.

Referring to the drawing in detail, the reference numeral 1 indicates the body of my attachment which is in the form of a visor of the usual shape now employed, in that it is flat and elongated and has outer rounded corners. The body is hollow and includes front and rear walls 2 and 3 respectively, side walls 4 and upper and lower walls 5 and 6 respectively.

The body is adjustably secured in position for use through the instrumentality of brackets that include body attaching members 7 of substantially U-form in that they are provided with arms 8 having openings therein to receive screws or like securing means for fixing the attaching members to the body, as clearly shown in Figure 4. Formed on the bight portions of each of the attaching members is a pair of apertured ears 9 between which is pivoted the reduced lower end of mounting arms 10 the latter being fixed in any suitable manner to the top of the vehicle, adjacent to the windshield so that the body is disposed accordingly to be swung on the arms 10 by the bracket members for disposal into and out of use, as will be apparent.

The body is preferably made from sheet metal and the front wall is provided with an elongated opening centrally arranged with respect thereto and longitudinally thereof. Securely mounted within the body is a frame plate 11 that is likewise made from sheet metal and has a right angled bent flange 12 disposed about the entire edge thereof and engaging the front wall adjacent to the edge of its opening to provide a channel as clearly shown in Figures 3 and 4 and within which is mounted a strip of glass 13 for fitting association therewith. The major portion of the frame plate 11 acts as a back for the strip of glass, and the ends of the frame plate are recessed to provide lamp housings 14 of a depth to contact the rear wall 3, as clearly shown in Figure 3.

The portion of the strip of glass 13 that is disposed in confronting relation to the back is silvered or otherwise treated to provide a mirror 15 while the portions of the strip in front of the housings 14 are frosted or otherwise treated as at 16 to subdue the light, as will be apparent.

The housings have sockets therein to receive bulbs 17 providing illuminating means, and suitable provision is made, whereby access may be had to the bulbs for changing the same. In the form as shown, the front wall 2 is removable from the remaining portion of the body, as well as from the frame plate, and in order to secure the front wall in position, I provide screw bolts 18 extending therethrough and which are received in bosses 19 fixed to the rear wall, as best shown in Figure 3.

A conductor 20 is connected to the bulb sockets and which has connected thereto a conductor 21, while a conductor 22 is grounded to the frame plate. The conductors 20 and 22 are adapted to be in electrical connection with the lighting system of the vehicle, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

An attachment for motor vehicles, comprising an elongated relatively flat body providing a visor, adjustable bracket means for mounting the body in position for use, said body being hollow and having a detachable front wall and provided with an elongated opening, a frame plate mounted in the body about the opening and including a right angle flange on the outer edge thereof cooperating with the front wall to provide a channel, a strip of glass in the channel and having a mirror portion and frosted portions at the ends thereof upon opposite sides of the mirror portion, lamp housings formed in the frame plate and covered by the frosted portions, illuminating means for the mirror and in the lamp housings and said front wall and glass being detachable to provide access to the lamp housings.

SIGURD THOMPSON.